(12) United States Patent
Mariani et al.

(10) Patent No.: US 8,578,989 B2
(45) Date of Patent: Nov. 12, 2013

(54) MOTOR VEHICLE TIRE

(75) Inventors: Mario Mariani, Milan (IT); Stefania Masciullo, Milan (IT); Pierangelo Misani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 273 days.

(21) Appl. No.: 12/994,697

(22) PCT Filed: May 28, 2008

(86) PCT No.: PCT/IT2008/000354
§ 371 (c)(1),
(2), (4) Date: Nov. 24, 2010

(87) PCT Pub. No.: WO2009/144752
PCT Pub. Date: Dec. 3, 2009

(65) Prior Publication Data
US 2011/0073232 A1 Mar. 31, 2011

(51) Int. Cl.
*B60C 9/18* (2006.01)
*B60C 9/22* (2006.01)

(52) U.S. Cl.
USPC .......................... 152/526; 152/531; 152/537

(58) Field of Classification Search
USPC .......................................... 152/526, 531, 537
See application file for complete search history.

(56) References Cited

U.S. PATENT DOCUMENTS

| | | | |
|---|---|---|---|
| 5,032,198 A | | 7/1991 | Kojima et al. |
| 5,400,847 A | * | 3/1995 | Suzuki et al. ................ 152/527 |
| 5,795,417 A | * | 8/1998 | Damke et al. ................ 152/527 |
| 5,975,175 A | | 11/1999 | Armellin |
| 6,988,520 B2 | | 1/2006 | Watkins et al. |
| 6,994,138 B2 | * | 2/2006 | Chaylard ...................... 152/531 |
| 2008/0087365 A1 | | 4/2008 | Potin |

FOREIGN PATENT DOCUMENTS

| | | |
|---|---|---|
| DE | 198 01 254 C1 | 3/1999 |
| EP | 0 774 367 A2 | 5/1997 |
| EP | 0 808 730 A1 | 11/1997 |
| FR | 2 875 736 | 3/2006 |

OTHER PUBLICATIONS

International Search Report from the European Patent Office for International Application No. PCT/IT2008/000354, mailing date Jan. 27, 2009.

* cited by examiner

*Primary Examiner* — Justin Fischer
(74) *Attorney, Agent, or Firm* — Finnegan, Henderson, Farabow, Garrett & Dunner, L.L.P.

(57) ABSTRACT

A motorcycle tire having a transverse curvature ratio f/C≥0.2 and a sidewall height ratio (H−f)/H≤0.7, has a belt structure provided with a belt layer including at least one filiform reinforcing element arranged to form a plurality of windings parallel to one another at a substantially zero angle relative to the equatorial plane of the tire. The available elongation of the belt in an intermediate zone between the equatorial plane, and the shoulder is greater than the available elongation corresponding to the equatorial plane. The aforementioned intermediate zone extends at least in a range centered on a camber angle of ±35°.

14 Claims, 3 Drawing Sheets

MOTOR VEHICLE TIRE

CROSS REFERENCE TO RELATED APPLICATION

This application is a national phase application based on PCT/IT2008/000354, filed May 28, 2008, the content of which is incorporated herein by reference.

BACKGROUND OF THE INVENTION

1. Field of the Invention

The present invention relates to tyres for motor vehicles. In particular, the present invention relates to tyres intended for fitting on the front wheel and/or on the rear wheel of sports/touring motor vehicles of large cylinder capacity (for example 1200 cm$^3$ or more), and/or high power (for example 140-150 BHP or more).

2. Description of the Related Art

In general, a tyre for vehicle wheels comprises a carcass structure essentially composed of one or more carcass plies formed according to a substantially toroidal configuration and having the actual side edges axially opposed engaging with respective annular reinforcing structures incorporating metallic circular inserts, usually called "bead wires". Each annular reinforcing structure is embedded in a so-called "bead" for anchoring the latter to a corresponding fitting rim.

A belt structure comprising one or more belt layers shaped as a closed ring, essentially composed of textile or metal cords suitably oriented relative to one another and relative to the cords belonging to the adjacent carcass plies, is applied on the carcass structure, in a radially external position.

A tyre tread, normally comprising a band of elastomeric material of adequate thickness, is further applied in a position radially external to the belt structure. The term "elastomeric material" typically comprises at least one elastomeric polymer and at least one reinforcing filler. Preferably, the elastomeric material further comprises additives, such as crosslinking agents and/or plasticizers. Owing to the presence of the crosslinking agents, on heating, said material can be crosslinked, so as to form the final article.

A pair of sidewalls each of which covers a lateral portion of the tyre between a so-called shoulder zone, positioned close to the corresponding side edge of the tyre tread, and the corresponding bead, can be applied on the opposite sides of the tyre.

Relative to the tyres for four-wheeled vehicles, the tyres for two-wheeled vehicles have to meet quite particular requirements, involving numerous structural differences. One of the most important differences arises from the fact that while travelling along a curve, a motorcycle must lean considerably relative to the position while travelling in a straight line, forming, with the perpendicular to the ground, an angle (called the camber angle) that can reach 45°, or even 65° in extreme driving conditions. Therefore, when the motorcycle goes into a curve, the area of contact of the tyre is displaced progressively from the central zone of the tread towards the axially outermost zone in the direction of the centre of the curve. For this reason the tyres for two-wheeled vehicles are characterized by their accentuated transverse curvature. This transverse curvature is normally defined by the particular value of the ratio of the distance between the radially outermost point of the tread and the line passing through the laterally opposite ends of the tread itself, measured on the equatorial plane of the tyre, to the distance measured along the chord of the tyre between said ends. In tyres for two-wheeled vehicles, the value of the curvature ratio is, in general, not less than 0.15, and is normally of the order of about 0.3 in the case of rear tyres, and even higher, up to about 0.45, in the case of front tyres, compared with a value only of the order of about 0.05 in motor vehicle tyres.

In tyres for motor vehicles, moreover, the belt structure can be provided by one or more continuous cords wound as turns axially close together and substantially parallel to the direction of circumferential development of the tyre itself (so-called "zero-degrees belt").

Recently there has been a trend for motor vehicles for sports/touring use with ever increasing cylinder capacity and/or power to be marketed. In fact, for example, motor vehicles for road use with cylinder capacity of 1250 cm$^3$, with power of 140-150 BHP, are already on the market.

The tyres fitted to the wheels of such motor vehicles must possess excellent qualities of road grip, for the high torque to be able to be transmitted to the ground, whether while travelling in a straight line, or especially while accelerating when coming out of a curve, as well as guaranteeing an effective braking action. Grip becomes a really critical point in conditions of driving on a wet road surface.

Together with excellent road grip, tyres must guarantee stable behaviour in particular while travelling in a straight line and the ability to last a high mileage. Stable tyre behaviour is in fact an indicator of its capacity for efficiently damping the perturbations transmitted from the irregularities of the road surface while travelling, so that these perturbations are not transmitted to the motor vehicle, compromising driving stability.

For better grip on the road surface it is possible to use soft compounds, which are able to adapt to the profile resulting from the asperities of the road surface and/or penetrate said asperities. These compounds are characterized by low elastic modulus and/or high hysteresis.

However, compounds that are too soft lead to reduced straight-line stability and lower mileage.

To overcome the aforementioned problems, tyres have been proposed with treads comprising various compounds.

U.S. Pat. No. 6,988,520 describes a motor vehicle tyre comprising a tread reinforced with a belt structure that has, in its normally inflated conditions, a curvature value C/L between about 0.5 and 0.7, a reinforced carcass ply that extends radially inwards relative to the belt stack and between the two bead regions and wound in each bead region around an annular bead wire from inside to outside in the axial direction to form a carcass that is backfolded and with the sidewalls of the tyre arranged between the edges of the tread and the bead regions. The belt structure comprises two belt plies comprising reinforcing cords inclined relative to the circumferential direction of the tyre, characterized in that the tread comprises two different compounds, the first compound that extends in a first layer between the edges of the tread and the second compound arranged in a second layer radially external relative to the first layer in the central portion of the tread.

EP 0,774,367 describes a motorcycle tyre that has, when normally inflated, a curvature value C/L of about 0.5 and 0.7. In the right axial section the tread comprises two tread rubber components of different compound, joined together by a scarf joint, said scarf joint having a width (JW) less than the tread width (TW) and an intertread ply comprising reinforcing cords interposed between the two tread rubber components of different compound.

SUMMARY OF THE INVENTION

The applicant noticed that the presence of several compounds on the tread surface creates a discontinuity in the structure of the tyre that the driver of the vehicle perceives as drive instability.

The applicant further noticed that the presence of several compounds in the tread can cause, in the interface zone of the compounds, the development of phenomena of irregular wear as well as aesthetic impairment of the tyre profile.

Irregular wear is to be avoided as it leads to a decline in accuracy of driving and a reduction of the useful life of the tyre.

The applicant has now found that it is possible to obtain a tyre that is able to offer excellent road grip, in particular when accelerating out of a curve, and more stable behaviour, in particular while travelling in a straight line, combined with the capacity for covering an increased mileage, even with a fully-laden vehicle, as a distinguishing feature of the structure of the belt of the tyre.

In particular, the applicant has now found that if the available elongation of the tyre is differentiated between centre and shoulder, in particular of its belt structure at zero degrees, it is possible to improve the behaviour of the tyre at the shoulder and crown in the various situations of driving in a straight line and on a curve.

In a first aspect, the invention relates to a method for controlling the driving characteristics of a motor vehicle tyre having a transverse curvature ratio f/C≥0.2 and a sidewall height ratio (H−f)/H≤0.7;

said motor vehicle tyre having a belt structure provided with a belt layer comprising at least one filiform reinforcing element arranged to form a plurality of windings parallel to one another at a substantially zero angle relative to the equatorial plane (X-X) of the tyre;

said method comprising increasing the available elongation of the belt in an intermediate zone between equatorial plane (X-X) and shoulder relative to the available elongation corresponding to the equatorial plane (X-X);

in which said intermediate zone extends at least in a range centred on a camber angle of ±35°.

According to another aspect, the present invention relates to a motor vehicle tyre comprising:

a carcass structure comprising a central crown portion and two axially opposed lateral portions, each lateral portion being associated with a respective bead structure;

a belt structure applied in a position radially external to the carcass structure;

a tyre tread applied in a position radially external relative to the belt structure;

said tyre having a transverse curvature ratio f/C≥0.2 and a sidewall height ratio (H−f)/H≤0.7;

said belt structure being provided with a belt layer comprising at least one filiform reinforcing element arranged to form a plurality of windings parallel to one another at a substantially zero angle relative to the equatorial plane of the tyre;

in which, in an intermediate zone between equatorial plane (X-X) and shoulder, said belt has an available elongation greater than the available elongation corresponding to the equatorial plane;

in which said intermediate zone extends at least in a range centred on a camber angle of ±35°.

For the purposes of the present invention "available elongation" of a tyre and/or of its zero-degrees belt means the elongation that the belt (its reinforcing elements) is able to provide in the vulcanized tyre, substantially free from load and/or inflation pressure.

The applicant notes that in a tyre with a belt made up of a zero-degrees layer, the available elongation of the belt in fact represents the available elongation for the tyre profile when rolling at high speed, except for a small portion corresponding to the axially outer edges of the tyre tread. In this latter portion there may in fact be edge effects due to the presence of the sidewall and/or of the bead.

The available elongation can be measured from the tyre profile in a rolling test on it at high speed (for example 250 km/h), at predefined small values of load and pressure (for example 0.5 bar and nominal load of about 8%-12%).

Moreover, still for the purposes of the present invention "camber angle" means the angle between the equatorial plane of the tyre and a plane orthogonal to the road surface.

Moreover, for the purposes of the present invention, the generic expression "range" referring to particular values of angular magnitude means a range of 10° of amplitude.

The zone corresponding to a range centred on camber angles of ±35° corresponds to the portion of greatest interest for the stability and performance of the tyre as it comes out of a curve, i.e. the zone in which greater grip is required. In this zone, the reduced tension of the cords interacts with the compound to create greater grip of the tyre.

The present invention, in one or more preferred aspects, can comprise one or more of the characteristics stated hereunder.

Preferably, the intermediate zone extends up to at least a camber angle of ±45°.

According to one embodiment the intermediate zone extends over an angular amplitude of at least 30°.

Advantageously, the intermediate zone extends until to the equatorial plane.

In particular, the tyre has a greater rigidity corresponding to the equatorial plane where stability is required while travelling in a straight line and capacity for efficiently damping the perturbations transmitted from the irregularities of the road surface, and lower rigidity corresponding to mid-shoulder.

In this latter zone, the lower rigidity of the tyre ensures it has greater grip on the ground, for efficiently transmitting to the ground the high torque when accelerating out of a curve, as well as ensuring, still in said conditions, an efficient braking action.

According to one embodiment, the available elongation is substantially increasing from a range centred on the equatorial plane and a range centred on a camber angle of about ±20°.

In this way, we obtain uniform differentiation of the behaviour of the tyre moving from the equatorial plane towards the shoulders.

In the rest of the present description and in the appended claims, the expression "is substantially increasing" includes both the condition for which the value of available elongation of the cords increases monotonically increasing or the condition in which the value of the available elongation of the cords increases on average from a minimum value corresponding to a range centred on the equatorial plane to a maximum value corresponding to a range centred on a camber angle of about ±20°.

According to another embodiment, in which the available elongation is substantially decreasing between a range centred on a camber angle of about ±45° and the shoulder.

In the rest of the present description and in the appended claims, the expression "is substantially decreasing" includes both the condition for which the value of the available elongation of the cords decreases monotonically decreasing or the condition in which the value of the available elongation of the cords decreases on average from a maximum value corresponding to a camber angle of about ±45° to a lower value corresponding to the shoulders, i.e. corresponding to a camber angle of about ±55°.

In one embodiment, the difference in available elongation between a range centred on the equatorial plane (X-X) and a range centred on a camber angle of about ±35° is greater than 0.05%, if the tyre is inflated to about 0.5 bar, loaded at 30 kg and subjected to an increase in speed of at least 170 km/h.

Preferably, the difference in available elongation between a range centred on the equatorial plane (X-X) and a range centred on a camber angle of about ±35° is greater than 0.08%, if the tyre is inflated to about 0.5 bar, loaded at 30 kg and subjected to an increase in speed of at least 170 km/h.

According to one embodiment of the present invention, said filiform reinforcing elements are metallic. Preferably, said filiform reinforcing elements are made of steel with high elongation.

Even more preferably, the filiform reinforcing elements are made of steel with carbon content greater than 0.9%.

For the purposes of the present invention the filiform reinforcing elements are also described as cords.

According to one embodiment, the belt structure is formed from at least one strip of rubberized fabric comprising from 2 to 5 filiform reinforcing elements.

According to one embodiment, the filiform reinforcing elements are distributed with a density that decreases progressively from the equatorial plane towards the axially external extremity of the belt.

The decrease in density of the reinforcing elements will subsequently reduce the structural rigidity of the shoulders of the tyre, giving that zone greater grip when the motor vehicle is negotiating a curve.

Preferably, the density of said filiform reinforcing elements has a value not greater than 8 cords/cm in a zone of predetermined width straddling the equatorial plane (X-X).

Further characteristics and advantages of the present invention will become clearer from the detailed description of a preferred, but not exclusive, application of a motor vehicle tyre with a reinforcing structure according to the present invention.

BRIEF DESCRIPTION OF THE DRAWINGS

Said description will be presented hereunder, referring to the appended drawings, which are intended to be illustrative and therefore non-limiting, in which.

DETAILED DESCRIPTION OF THE INVENTION

Figure 1:
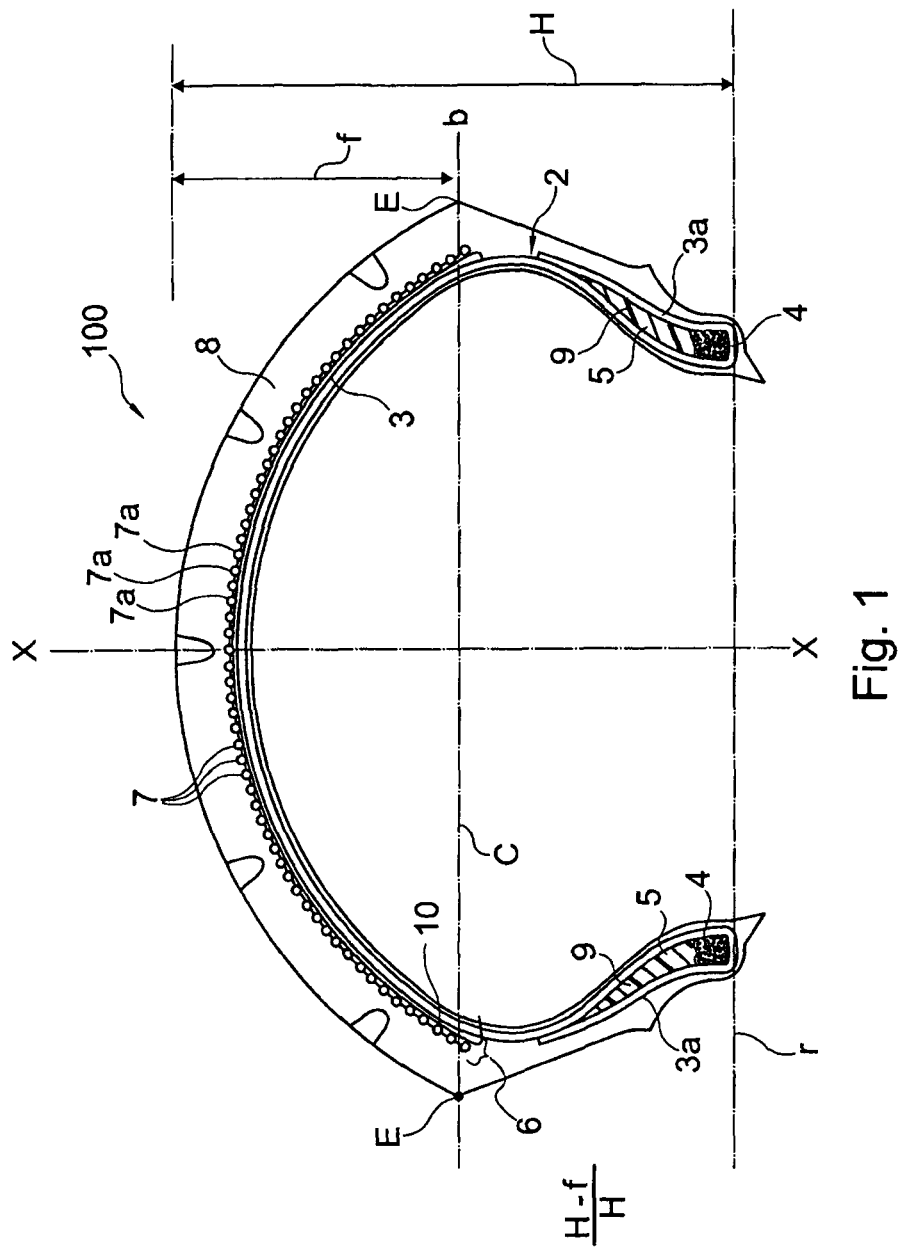
FIG. 1 is a radial section along a plane radial to the axis of rotation of a motor vehicle tyre according to the present invention.

Referring to the aforesaid drawings, 100 denotes the entire motor vehicle tyre according to the present invention.

The motor vehicle tyre 100 comprises a carcass structure 2 formed from at least one carcass ply 3. The carcass ply 3 is made of elastomeric material and comprises a plurality of reinforcing elements arranged parallel to one another.

The carcass ply 3 engages, by its opposite circumferential edges, with at least one annular reinforcing structure 9.

In particular, the opposite side edges 3a of the carcass ply 3 are backfolded around annular reinforcing structures called bead wires.

A tapering elastomeric bead filler 5 that occupies the space defined between the carcass ply 3 and the corresponding backfolded lateral edge 3a of the carcass ply 3, is applied on the axially outermost periphery of the bead wires 4.

As is well known, the zone of the tyre comprising the bead wire 4 and the bead filler 5 forms the so-called bead intended for anchoring the tyre on a corresponding fitting rim (not shown).

The reinforcing elements included in carcass ply 3 preferably comprise textile cords, selected from those usually employed in the manufacture of tyre carcasses, for example in nylon, rayon, PET, PEN, with unit thread of diameter between 0.35 mm and 1.5 mm.

In an alternative embodiment that is not shown, the opposite lateral edges of the carcass ply are connected without backfold to special annular reinforcing structures 9 provided with two annular inserts. A filler of elastomeric material can be arranged in a position axially external to the first annular insert. The second annular insert is, however, arranged in a position axially external to the end of the carcass ply. Finally, in a position axially external to said second annular insert, and not necessarily in contact with the latter, a further filler can be provided that completes the construction of the annular reinforcing structure.

A belt structure 6, which is covered circumferentially with a tyre tread 8 on which, following a moulding operation performed simultaneously with vulcanization of the tyre, longitudinal and/or transverse grooves are typically formed, arranged so as to define a desired tread pattern, is applied circumferentially on carcass structure 2, in a radially external position.

The composition of the tyre tread is such that the tread has a single compound on its radially external surface.

The tyre 100 can also comprise a pair of sidewalls applied laterally on opposite sides of said carcass structure 2.

The tyre 100 has a right section characterized by a high transverse curvature and by lowered sidewalls as defined hereunder.

In particular, the tyre 100 has a section height H measured, on the equatorial plane, between the ridge of the tyre tread and the fitting diameter, identified by the reference line r, passing through the beads of the tyre.

The tyre 100 has, moreover, a width C defined by the distance between the laterally opposite ends E of the tread itself, and a curvature defined by the particular value of the ratio of the distance f of the ridge of the tread from the line passing through the ends E of the tread itself, measured on the equatorial plane of the tyre, to the aforementioned width C. The ends E of the tread can be formed with an edge.

"Tyres with high curvature" means, in the present description and in the appended claims, tyres that have a curvature ratio f/C≥0.2 and preferably f/C≥0.28. Said curvature ratio f/C is, however, ≤0.8 and preferably f/C≤50.5.

With regard to the sidewalls, the invention preferably relates to tyres with particularly low sidewalls (FIG. 1). In other words, "tyres with low or lowered sidewalls" means, in the present description, tyres in which the sidewall height ratio (H−f)/H is less than 0.7 and more preferably less than 0.5.

The carcass structure 2 is typically coated on its inside walls with a sealing layer, or so-called "liner", essentially consisting of a layer of elastomeric material that is impermeable to air, able to guarantee hermeticity of the tyre itself once inflated.

Preferably, the belt structure 6 consists of a layer 7 that has a plurality of circumferential windings 7a arranged axially side by side, formed by a rubberized cord or by a strip comprising several rubberized cords (preferably from two to five), wound spirally with an angle of substantially zero (typically between 0° and 5°) relative to the equatorial plane X-X of the tyre. Preferably the belt extends substantially from one axially outermost lateral edge to the other.

The cords of belt structure 6 are metallic cords. Preferably, said cords are the well-known metallic cords of the type with high elongation (HE) whose use and whose characteristics have already been fully described for example in European patent EP 0,461,646 of the same applicant, to which reference should be made for further details.

Very briefly, said cords can be made up of a certain number of strands, from 1 to 5, preferably between 3 and 4, each strand consisting of a certain number of individual threads, from 2 to 10, preferably between 4 and 7, having a diameter greater than 0.10 mm, preferably between 0.12 and 0.35 mm. The threads in the strands and the strands in the cord are wound helically together in the same sense, with winding pitch equal or different for the threads and for the strands.

Preferably said cords are made from steel wires with high carbon content (HT) i.e. containing carbon at a percentage above 0.9%. In particular, in a special prototype prepared by the applicant the helical winding of layer 6 consists of a single cord 7a, known as 3×3×0.20 HE HT, wound from one end of the belt to the other. The aforementioned indication defines an equiverse metallic cord formed from 3 strands, each consisting of three unit threads of diameter equal to 0.20 mm: moreover, the symbol HE denotes "high elongation", and the symbol HT indicates "high tensile" steel, i.e. with high carbon content.

The cords with high elongation (HE) referred to here, have an elongation at break of at least 4%, preferably between 4% and 8% and a typical behaviour in tension, as is well known, so-called "spring-like behaviour", particularly suitable for the shaping and moulding of these tyres with high transverse curvature.

Figure 2:
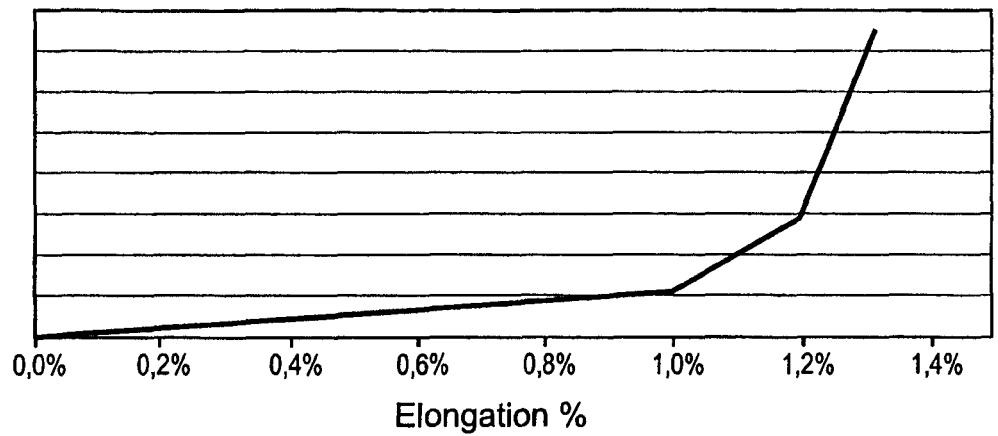
FIG. 2 shows schematically a load-elongation graph of an example of a reinforcing cord used in a tyre according to the present invention.

An example of load-elongation graph of a cord of the type mentioned above is shown in FIG. 2.

In particular, this graph shows a first section called the section with high deformability at low loads, a second section that is normally more inclined, known as the section with low deformability at high loads, or with high modulus, and a connecting section positioned between the first two.

The connecting section is found for values of elongation typically between about 1% and 4%.

In a particularly preferred embodiment the belt structure comprises just one layer of cords 7 arranged at a substantially zero angle relative to the equatorial plane X-X.

Optionally, the tyre 100 can also include a layer of elastomeric material 10 positioned between said carcass structure 2 and said belt structure 6 formed from said circumferential spirals, said layer 10 preferably extending over a surface substantially corresponding to the surface of development of said belt structure 6. Alternatively, said layer 10 extends over a surface smaller than the surface of development of belt structure 6, for example only over opposite lateral portions of the latter.

In a further embodiment, an additional layer of elastomeric material (not shown in FIG. 1) is put between said belt structure 6 and said tyre tread 8, said layer extending preferably over a surface substantially corresponding to the surface of development of said belt structure 6. Alternatively, said layer extends only along at least one portion of the development of belt structure 6, for example over opposite lateral portions of the latter.

In a preferred embodiment, at least one of said layer 10 and said additional layer comprises short aramid fibres, for example of Kevlar®, dispersed in said elastomeric material.

The cords 7a of belt structure 6 are arranged in tension in the belt layer or layers.

An amount of available elongation corresponds to the tension of the cords 7a.

The greater the tension to which the cord 7a is subjected, the smaller the available elongation, and vice versa.

According to an important characteristic of the invention, the cords of the belt layer have, in the tyre 100, a characteristic available elongation.

In particular, each of the cords 7a has a specific variation of available elongation as we move from the centre of the tyre to the shoulder.

In this way, stiffening of the belt structure is achieved exactly where it is useful, i.e. as a function of the driving characteristics that are required for the tyre.

In particular, the trend in available elongation of the cords increases as we move from the cords 7a close to the equatorial plane X-X towards the cords positioned at the shoulder.

The available elongation of the cords 7a does not increase continuously moving from the equatorial plane X-X to the shoulder, but has a maximum in an intermediate position.

Preferably, the cords 7a arranged at intervals of about 10° of amplitude centred respectively on camber angles of about +35° and −35° have an available elongation greater than the cords 7a arranged at the equatorial plane.

Preferably, the cords 7a arranged at intervals of about 10° of amplitude centred respectively on camber angles of about +35° and −35° have an available elongation significantly greater than the cords 7a arranged at the equatorial plane.

The aforementioned zone corresponds to the portion of greatest interest for the stability and performance of the tyre as it comes out of a curve, i.e. the zone in which, in these driving conditions, greater grip is required.

In this zone, the increased available elongation of the cords 7a interacts with the compound of the tread to create greater grip of the tyre while negotiating the curve and, in particular, when coming out of the curve.

Preferably, the cords 7a have an available elongation significantly greater than the cords 7a arranged corresponding to the equatorial plane for a zone that extends beyond a camber angle ±35°, in particular reaching at least a camber angle of ±45°.

This variation of the available elongation corresponds to a variation of the tension to which the cords 7a of the belt structure are subjected, such as for which in an intermediate zone corresponding to a camber angle of ±35° there is a lower value of tension, preferably significantly lower, relative to the tension value of the cords arranged corresponding to the equatorial plane.

The cords 7a placed in a range centred on a camber angle of about +35° or −35° can display a difference in tension greater than or equal to 10% relative to the cords 7a placed in a range centred on the equatorial plane (X-X).

Preferably, said difference is greater than or equal to 20%.

Moreover, if we consider a cord of the type previously described, there is a tension difference greater than or equal to about 1 newton among the cords 7a placed in a range of 10° of amplitude centred on the equatorial plane X-X and the cords 7a placed to correspond to a camber angle of ±35°.

Preferably said difference is greater than or equal to 2 newton.

The variation in tension is moreover such as to give an increase for the cords arranged corresponding to the shoulder of the tyre.

Figure 3:
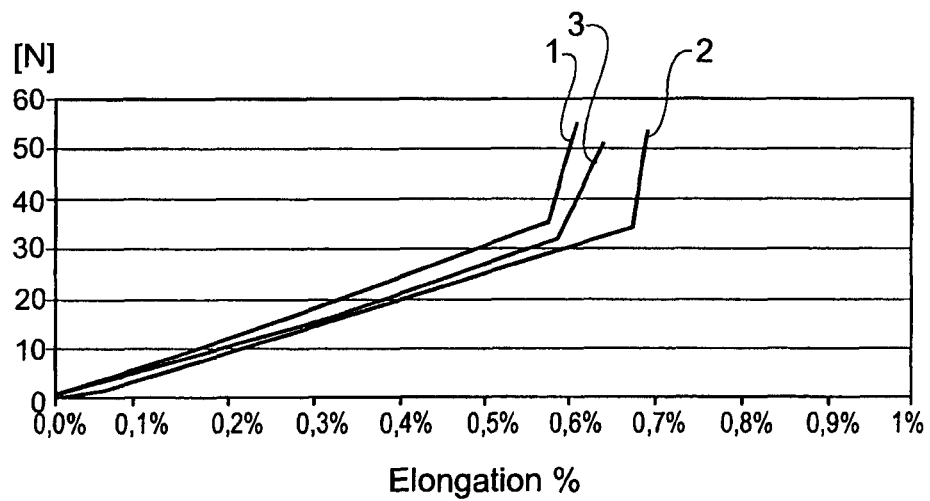
FIG. 3 shows schematically a load-elongation graph of three reinforcing cords arranged at three different points of the zero-degrees belt of a tyre according to the present invention.

FIG. 3 shows the schematic load-elongation graph of three cords 7a arranged corresponding to three points of a zero-degrees belt of an example of tyre according to the invention.

In particular, FIG. 3 shows a schematic load-elongation curve of a cord positioned to correspond to the equatorial plane X-X (curve 1), a schematic load-elongation curve of a cord positioned to correspond to a camber angle of about +35° or −35° (curve 2) and finally a schematic load-elongation curve of a cord 7a positioned to correspond to a camber angle of about +55° or −55° (curve 3).

As can be seen, curve 2 has a section of high elongation at low loads that extends less than the section with high elongation at low loads of curve 3, which in its turn has a section with high elongation at low loads that extends less than the corresponding section of curve 1.

The variation presented above shows that the cords 7a of the zero-degrees belt in the tyres according to the present invention have a greater value of available elongation corresponding to a range centred on a camber angle of about +35° or −35°.

At equal applied load, in fact, curve 2 has the maximum percentage elongation indicating that in said zone the cords 7a have greater available elongation and lower intrinsic tension.

Figure 4:
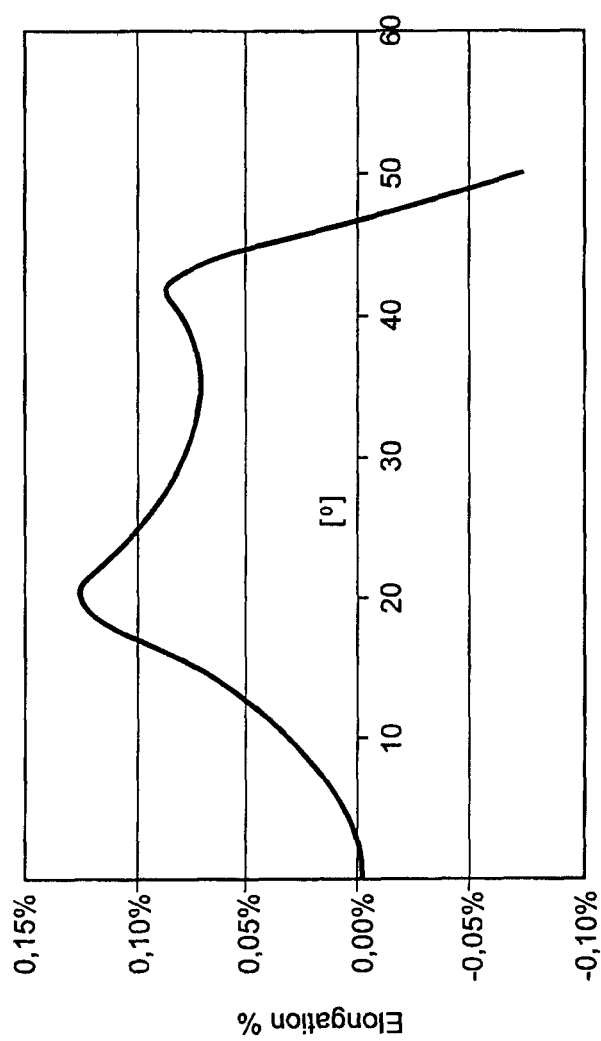
FIG. 4 shows a graph of the deformation of the dynamic profile as a function of the axial dimension of a tyre according to the invention subjected to a speed increase of 220 km/h.

However, FIG. 4 shows a graph with the percentage elongation, with tyre profile moving from the centre of the tyre 100 towards its axially outermost edges, i.e. towards the shoulder zone of a tyre according to the present invention.

To obtain the aforementioned graph, a tyre 180/55 ZR 17 was fitted on a wheel rim and inflated to a pressure of 0.5 bar.

In these conditions the tyre is positioned against a rotating drum, and loaded with a load equal to 30 kg (equal to about 8%-12% of its nominal load).

These values of pressure and load are sufficiently low to be able to evaluate the available elongation of the tyre and of its zero-degrees belt without significantly affecting their values relative to a situation with a tyre that is uninflated and completely unloaded.

In a position radially opposite to the position of contact with the rotating drum there is an optical sensor of the laser type that is displaced along the axial direction of the tyre to record its dynamic profile.

At this point, the drum is rotated in such a way as to obtain, on the tyre, a peripheral speed at the point of contact between tyre and drum equal to $V_1=30$ km/h and then $V_2=250$ km/h.

Thus, the dynamic profile of the tyre is recorded with said laser sensor for $V_1=30$ km/h and for $V_2=250$ km/h.

The difference between the two profiles divided by the radius of the tyre at each point of the profile at speed $V_1=30$ km/h gives the percentage elongation of the tyre profile subjected to a difference of load due to the two different speeds.

The results obtained by the aforementioned measurements were filtered to eliminate possible spurious variations, for example variations due to the localized presence of gaps, sampling frequency and timing between laser sensor and speed of rotation of the tyre.

The graph in FIG. 4 shows the "rescaled" values of elongation taking as reference the value of elongation of the tyre profile corresponding to the equatorial plane.

As can be seen from the graph in FIG. 4, the tyre 100 of the present invention, tested in the manner described above, has an elongation increasing up to a camber angle of about 20° (axial direction), then remaining constant at about 0.07%-0.08% of percentage elongation, up to about 40°, and then decreasing again rapidly.

In other words, there is a zone of maximum available elongation between about 20° and about 40° in the axial direction. At a camber angle of about 30-35° there is a significant value of available elongation, 0.05% greater relative to the elongation of cords 7a corresponding to the equatorial plane.

Other tests carried out by the applicant demonstrated that the aforementioned difference of 0.05% between the elongations of the cords corresponding to camber angles of ±35° and those corresponding to the equatorial plane X-X is also maintained for lower speeds $V_2$, up to a difference in speed equal to about 170 km/h.

It should be noted, moreover, that it can also be inferred from the aforementioned graph that the cords 7a of the present invention have a variation of tension in the tyre opposite to that of the aforementioned graph. In other words, there is a point of minimum tension between about 20° and about 40° in the axial direction. Around a camber angle of about 30-35° there is a tension value 10% lower relative to the tension value of the cords 7a corresponding to the equatorial plane.

The test described above provides an excellent test for determining the possible variation in available elongation of the cords 7a of the zero-degrees belt of a tyre 100 between the equatorial plane X-X and the shoulder.

The following Table 1 presents the driving results obtained by comparing two sets of tyres mounted on the wheels of a motor vehicle (Yamaha FJR 1300) loaded with the weight of a passenger with the addition of side bags of 10 kg on each side.

The two sets only differ for the rear tyre. In particular, the second set has a tyre according to the invention of size 180/55 ZR 17, whereas the first set has a rear tyre Z6® Metzler of equal size, same tyre tread and same carcass/belt structure, apart from the structure of the zero-degrees belt.

Table 1 shows the values obtained with the tyre according to the invention relative to the comparative tyre for five parameters: self-induced stability, pudding at angles, recovery from manoeuvre, recovery in speed down, grip on curves.

TABLE 1

|  | Speed (km/h) | 1st Set (comparative) | 2nd Set (invention) |
| --- | --- | --- | --- |
| Stability coming out of a curve | 160 | 4.00 | 4.50 |
|  | 180 | 2.90 | 3.90 |
|  | 200 | 2.70 | 3.80 |
|  | 220 | 2.60 | 3.70 |
| Pudding at angles | 160 | 3.20 | 4.00 |
|  | 180 | 2.90 | 3.90 |
|  | 200 | 2.70 | 3.80 |
| Recovery from manoeuvre |  | 3.50 | 4.00 |
| Recovery in speed down |  | 3.50 | 4.00 |
| Grip on curves |  | 4.00 | 4.50 |

The tyre according to the invention has overall better behaviour relative to the comparative tyre for all the characteristics evaluated.

Stability on a curve, pudding at angles and grip on a curve are very important characteristics for the behaviour of the tyre on curves, both when accelerating coming out of the curve and in travelling at the maximum bend. In particular, the contribution from different tensioning of the belt (or of the cords of which it is constituted) in this zone makes it possible to avoid a decrease in stability when accelerating out of a curve, encountered in tyres with double compound.

On the other hand the recovery from manoeuvre and in speed down are excellent indices of stability when travelling in a straight line and of its capacity to damp vibrations with this type of travelling.

In other words, the set with the rear tyre according to the invention ensures better behaviour in the area of stability under load relative to the reference set.

In particular, the rear tyre according to the present invention ensures adequate compactness of the structure both vertically and laterally, without compromising the capacity for absorbing vibrations or asperities of the road surface and hence negative steering sensitivity in terms of damping/containment of oscillations:

The present invention has been described with reference to some embodiments. Various changes can be made to the embodiments described in detail, but remaining within the scope of protection of the invention, defined by the following claims.

For example the applicant considers that the same advantages could also be encountered in a front tyre provided with the same differentiation of available elongation of the zero-degrees belt between centre and shoulder as an alternative and/or in combination with a rear tyre as previously described.

The invention claimed is:

1. A motor vehicle tyre comprising:
a carcass structure comprising a central crown portion and two axially opposed lateral portions, each lateral portion being associated with a respective bead structure;
a belt structure applied in a position radially external to the carcass structure; and
a tyre tread applied in a position radially external relative to the belt structure,
said tyre having a transverse curvature ratio $f/C \geq 0.2$ and a sidewall height ratio $(H-f) \leq 0.7$; and
said belt structure being provided with a belt layer comprising at least one filiform reinforcing element arranged to form a plurality of windings parallel to one another at a substantially zero angle relative to an equatorial plane of the tyre,
wherein, in an intermediate zone between the equatorial plane and a shoulder, said belt has an available elongation greater than an available elongation corresponding to the equatorial plane; and
wherein said intermediate zone extends at least in a range centred on a camber angle of $\pm 35°$, and
wherein the available elongation is substantially decreasing between a range centred on a camber angle of about $\pm 45°$ and the shoulder.

2. The tyre according to claim 1, wherein the intermediate zone extends up to at least a camber angle of $\pm 45°$.

3. The tyre according to claim 1, wherein the intermediate zone extends over an angular amplitude of at least $30°$.

4. The tyre according to claim 1, wherein the intermediate zone extends to the equatorial plane.

5. The tyre according to claim 1, wherein the available elongation is substantially increasing from a range centred on the equatorial plane and a range centred on a camber angle of about $\pm 20°$.

6. The tyre according to claim 1, wherein a difference in available elongation between a range centred on the equatorial plane and a range centred on a camber angle of about $\pm 35°$ is greater than 0.05%, if the tyre is inflated to about 0.5 bar, loaded at 30 kg and subjected to an increase in speed of at least 170 km/h.

7. The tyre according to claim 6, wherein said difference in available elongation between a range centred on the equatorial plane and a range centred on a camber angle of about $\pm 35°$ is greater than 0.08%, if the tyre is inflated to about 0.5 bar, loaded at 30 kg and subjected to an increase in speed of at least 170 km/h.

8. The tyre according to claim 1, wherein said filiform reinforcing elements are metallic.

9. The tyre according to claim 8, wherein said filiform reinforcing elements are made of steel with high elongation.

10. The tyre according to claim 8, wherein said filiform reinforcing elements are made of steel with carbon content greater than 0.9%.

11. The tyre according to claim 1, wherein the belt structure is formed from at least one strip of rubberized fabric comprising 2 to 5 filiform reinforcing elements.

12. The tyre according to claim 1, wherein said filiform reinforcing elements are distributed with a density that decreases progressively from the equatorial plane toward an axially external extremity of the belt structure.

13. The tyre according to claim 1, wherein a density of said filiform reinforcing elements has a value not greater than 8 cords/cm in a zone of predetermined width straddling the equatorial plane.

14. A method for controlling the driving characteristics of a motor vehicle, comprising providing a tyre having a transverse curvature ratio $f/C \geq 0.2$ and a sidewall height ratio $(H-f)/H \leq 0.7$,
said motor vehicle tyre having a belt structure provided with a belt layer comprising at least one filiform reinforcing element arranged to form a plurality of windings parallel to one another at a substantially zero angle relative to an equatorial plane of the tyre; and
said method comprising increasing an available elongation of the belt in an intermediate zone between the equatorial plane and a shoulder relative to the available elongation corresponding to the equatorial plane,
wherein said intermediate zone extends at least in a range centred on a camber angle of $\pm 35°$,
said method further comprising substantially decreasing the available elongation of the belt between a range centred on a camber angle of about $\pm 45°$ and the shoulder.

* * * * *